United States Patent [19]

Kanehira et al.

[11] Patent Number: 4,755,163
[45] Date of Patent: Jul. 5, 1988

[54] PUSH-DRIVE CHAIN

[75] Inventors: Makoto Kanehira, Hiratuka; Takerou Nakagawa; Yasumasa Tsubakimoto, both of Osaka; Fumio Ochiai, Daito; Takashi Koizumi, Nara, all of Japan

[73] Assignee: Tsubakimoto Chain Co., Japan

[21] Appl. No.: 24,413

[22] Filed: Mar. 11, 1987

[30] Foreign Application Priority Data

Mar. 28, 1986 [JP] Japan ................... 51-68506

[51] Int. Cl.⁴ .............................................. F16G 1/24
[52] U.S. Cl. ..................................... 474/242; 474/201
[58] Field of Search ............... 474/201, 237, 238, 240, 474/242, 244, 245, 265

[56] References Cited

U.S. PATENT DOCUMENTS 4,386,922 6/1983 Ivey ................................. 474/201 X
4,473,365 9/1984 Lapeyre ......................... 474/242 X

FOREIGN PATENT DOCUMENTS 55-6783 2/1980 Japan.

Primary Examiner—Stephen J. Novosad
Assistant Examiner—Thuy M. Bui
Attorney, Agent, or Firm—Steele, Gould & Fried

[57] ABSTRACT

A continuous push-drive chain formed by a plurality of blocks, each of the blocks having a letter V-shaped configuration in side elevation, defining large engagement surfaces relative to overall block size; and, structure for connecting adjacent blocks to one another disposed at one distal end of the V-shaped configuration, whereby large pushing forces between the blocks may be transmitted substantially unidirectionally and independently of the connecting structure, simultaneously increasing chain load capacity and reducing chain wear.

5 Claims, 4 Drawing Sheets

FIG. 8
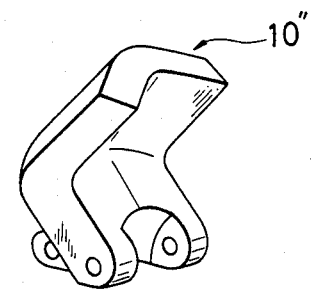
FIG. 9          FIG. 10          FIG. 11
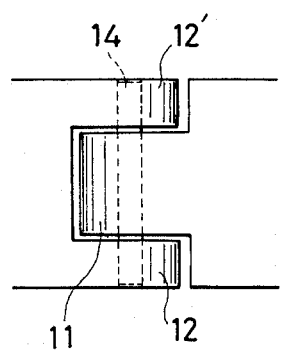 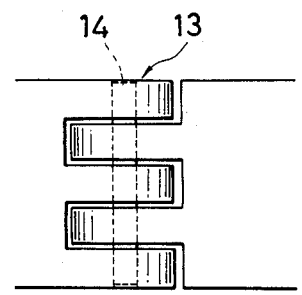 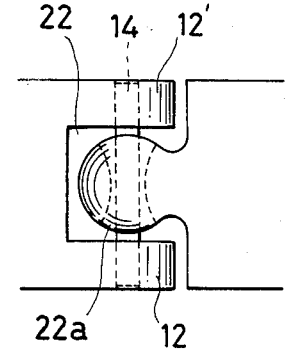

PUSH-DRIVE CHAIN

BACKGROUND OF THE INVENTION

1. Field of the Invention

The invention relates to the field of push-drive chains, which are different from pull-drive chains as are known in the prior art, insofar as push-drive chains are not subject to elongation due to wearing of parts when such chains are used for power transmission or power transfer.

2. Prior Art

Typical pull-drive chains as are known in the prior art, as for example roller chains and the like, are generally used to transmit or transfer power by a pulling operation. Such pull-drive chains are especially subject to wear over time, particularly at the connection points of constituent parts of such chains.

Push-drive chains, on the other hand, are available for continuously variable transmission chains, often referred to as CVT chains. A typical example is described in Japanese Patent Publication No. 6783/1980, wherein a chain formed by a plurality of connected blocks operates in such a fashion that each block pushes an adjacent block, rather than pulling an adjacent block. Despite the general advantage of push-drive chains noted above, the CVT chains disclosed in the noted Janpanese patent publication are of seriously deficient design, in that the blocks are subject to unsteady movement and buckling, each of the blocks having flat or plate-like engagement surfaces. Moreover, the tendency of such block elements to be displaced relative to one another and/or buckle during movement places excessive loads on, and causes excessive wear of the connection means, frequently connecting or link pins.

SUMMARY OF THE INVENTION

The invention relates to a continuous chain which is intended solely for power transmission or transfer by a pushing operation. A continuous push-drive chain according to this invention comprises: a plurality of blocks, each of the blocks having a V-shaped configuration in side elevation, defining large engagement surfaces relative to overall block size; and, means for connecting adjacent blocks disposed at one distal end of the V-shaped configuration, whereby large pushing forces the blocks may be transmitted substantially unidirectionally and independently of the connecting means, simultaneously increasing chain load capacity while reducing chain wear. The configuration of the blocks in side elevation may be alternatively described as generally dog leg or generally partially circular or arcuate. In each instance, the connecting means are disposed at one end of the block which is most distant from the apex of the V-shape, or alternatively, the center of the dog leg or circular shape. Generally speaking, the apex or center of the V-shaped configuration is in alignment with the center line or longitudinal axis of the chain and the driving force transmitted by the continuous chain. Such continuous chains are frequently driven by, and in turn drive, variable width pulleys. When intended for such application, each of the blocks may also have a trapezoidal or wedge-shaped configuration when viewed in front and rear elevation. In this application, the connecting means are disposed at the distal end of the V-shaped configuration corresponding to the narrower parallel face of the trapezoidal shape.

As a result of the blocks being connected to one another by connecting means disposed at a position most distant from the center of the block, and as a result of the blocks being driven by receiving a pushing operation, almost all of the cross sectional areas of the blocks can be used to transmit and receive the pushing force. Such a construction makes it possible to substantially increase the amount of power being transmitted per unit cross sectional area. Such construction also eliminates the need to reduce the level of power being transmitted due to wear limitations of blocks and portions of blocks sliding relative to one another and relative to the connecting means. Moreover, the V-shaped configuration defines pairs of swept-back engagement surfaces which resist relative movement along at least one line of movement in such a way that forces directed off the longitudinal chain axis neutralize one another and the driving force transmitted by the chain is substantially unidirectional, and accordingly quite stable.

BRIEF DESCRIPTION OF THE DRAWINGS

For the purpose of illustrating the invention, there are shown in the drawings forms which are presently preferred; it being understood, however, that the invention is not limited to the precise arrangements and instrumentalities shown.

FIG. 8 is a perspective view of an alternative embodiment of a block for a continuous push-drive chain according to this invention which embodiment provides transverse stability;

FIG. 9 is partial bottom plan of two blocks according to FIGS. 1–4, connected to one another;

FIG. 10 is a partial bottom plan showing a first alternative structure for connecting adjacent blocks; and, FIG. 11 is a partial bottom plan view showing a second alternative embodiment for connecting adjacent blocks.

DETAILED DESCRIPTION OF THE PREFERRED EMBODIMENTS

Figure 5:
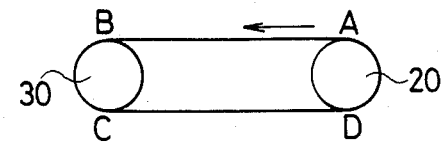
FIG. 5 is a diagrammatic illustration of an operating push-drive chain operatably associated with a driving and a driven pulley.

A continuous push-drive chain according to this invention is formed by a plurality of blocks 10 as shown in FIGS. 1–4. A large number of blocks 10 are connected one another in an endless configuration for application as shown in FIG. 5, by way of the connecting means shown in FIGS. 9–11, or by other connecting means.

Figure 1:
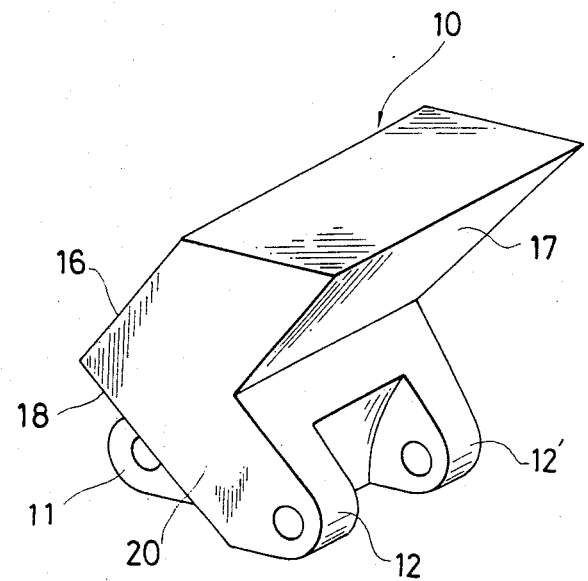
FIG. 1 is a perspective view of a block for forming a continuous push-drive chain according to this invention.
Figure 2:
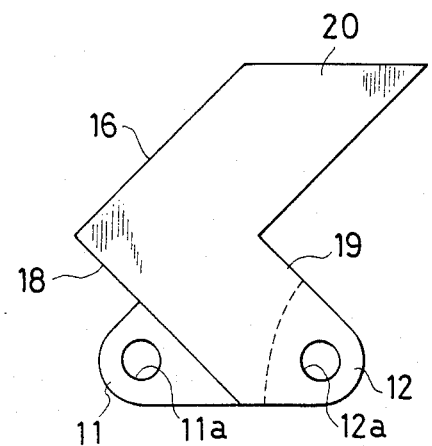
FIG. 2 is a left side elevation of FIG. 1.
Figure 3:
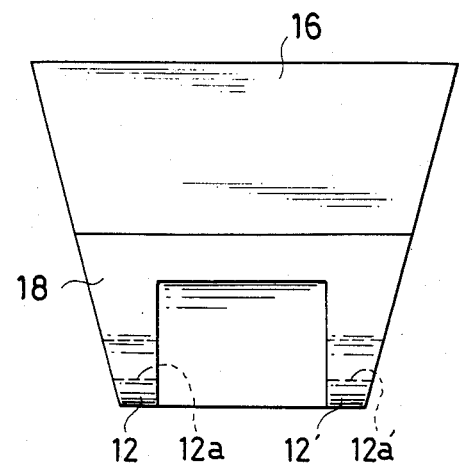
FIG. 3 is a front elevation of FIG. 1.
Figure 4:
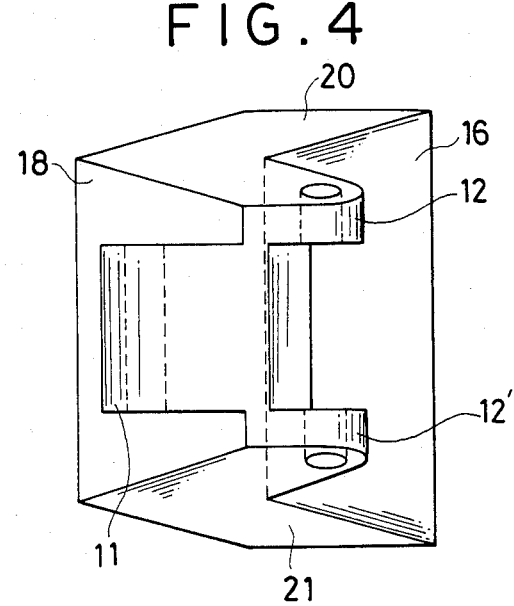
FIG. 4 is a bottom plan of FIG. 1.

As best shown in FIGS. 1 and 2, each block 10 has a generally letter V-shaped configuration in side elevation. The configuration might also be described as a dog leg, or as circular or arcuate, as suggested by the alternative embodiment shown in FIG. 8. The V-shaped configuration has legs or portions which are swept-back, with respect to the direction in which the blocks travel while transmitting the pushing force. The upper leg comprises engagement surfaces 16 and 17 for pushing and for being pushed, respectively. The lower leg comprises engagement sufaces 18 and 19 for pushing and for being pushed, respectively. The line depiction of the chain and pulley assembly in FIG. 5 may be thought of a showing the center line or longitudinal axis of the chain, which axis or center line corresponds in alignment with an axis of substantial symmetry running through the apex of the V-shaped configuration.

Means for connecting each block to an adjacent block are disposed at one distal end of the V-shaped configuration. In the embodiment shown in FIGS. 1–4, a projecting part 11 is held between projecting parts 12 and 12' of an adjoining block, the blocks being connected to one another by connection pins 14 (see FIG. 9) through aligned bores 11a, 12a and 12a'. Connection pins 14 may be retained in place by various means known in the art, as well as by other means taught in commonly owned copending applications.

Figure 6:
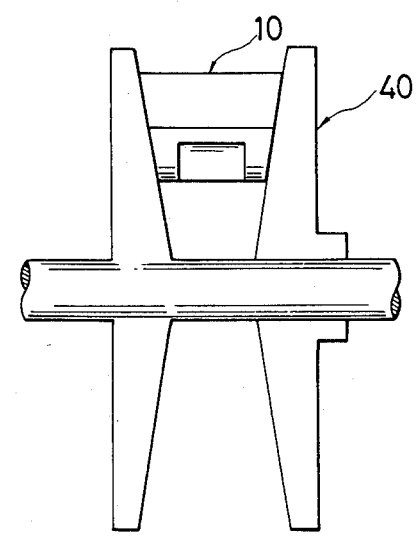
FIG. 6 is a front elevation of a block according to FIGS. 1–4 engaged with a variable width pulley as utilized in the system FIG. 5.

Each block 12 may also be provided with a wedge-shaped or trapezoidally shaped configuration when viewed in front and rear elevation, to enable efficient engagement between the lateral or side walls 20 and 21 of the block 12 and the walls of a variable width pulley 40, as shown in FIG. 6.

With reference to FIG. 5, pulley 20 is a driving pulley and pulley 30 is a driven pulley. The section of the continuous chain between points A and B is subject to the application of a transmission force caused by a pushing operation. On the other hand, as blocks in chain 30 travel from point C to point D, there is essentially no load at all, each block being merely held in place by the connection pins. The blocks are essentially completely unloaded in the section between points C and D.

In an alternative embodiment not illustrated in the drawings, each block may be provided with a concave/convex section on the lower surface or the sides of each block, such blocks being thereby adapted for use with toothed sprockets and the like, rather than continuously variable width pulleys. In this application, it is not necessary that the blocks have the wedge or trapezoidal configuration in front and rear plan.

Figure 7:
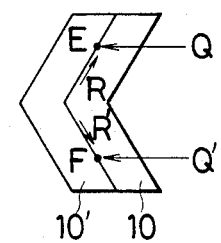
FIG. 7 is a force diagram for the block shown in FIGS. 1–4.

FIG. 7 is a force diagram for two adjacent blocks 10 and 10', wherein block 10' is pushed to the left (in the sense of FIG. 7) by block 10. Two points E and F are chosen to be symmetrical with respect to the leading point of apex of block 10. The force exerted at each of points E and F may be thought of as the vector sum of two individual force components illustrated by arrows Q and R, and arrows Q' and R', respectively. It will be appreciated that, for any set of symmetrical points E and F, corresponding outwardly directed force components R and R' will neutralize or cancel one another out, resulting in a set of unidirectional force components Q and Q' in the pushing direction. The absence of net force components directed outwardly or interiorly of the center line or longitudinal axis of the chain provides a very stable arrangement. To the extent that the blocks 10 may not engage in a theoretically perfect arrangement, the angularly related engagement surfaces of adjacent blocks tend to prevent unsteady movement by the resulting nested engagement of adjacent blocks.

Relative lateral movement between adjacent blocks can be inhibited by the configuration of block 10'' as shown in FIG. 8. Block 10'' provides a double-nested configuration which not only tends to suppress movement exteriorly and interiorly of the chain axis, but tends to suppress relative lateral movement as well. Although such lateral movement can also be suppressed by the interconnected projecting portions of the connecting means, reliance on this structure might place undue wear on the projections and connecting pins, contrary to the objects of this invention. Accordingly, in applications where such lateral instability is likely, a configuration according to that shown in FIG. 8 may very well be preferred to the configuration shown in FIGS. 1–4.

It will be noted that the projecting parts forming the structure for connecting adjacent blocks is disposed as far as possible from the center line of the block, relative to the center line of the chain. This positioning enables the engagement surfaces to be as large as possible, so as to provide the greatest cross-sectional area for transmitting driving forces. This enables larger driving forces to be generated and, at the same time, reduces the load per unit cross sectional area of each block.

In the connecting structure shown in FIG. 10, five interleaving members forming comb-shaped engagement structure 13 connect adjacent blocks. This structure tends to be stronger than the connecting structure shown in FIG. 9.

The connection structure shown in FIG. 11, which includes a spherical projection 22, enables each block to swing laterally or transversely with respect to the block adjacent thereto in addition to the pivotal movement. Spherical projection 22 has a bore 22a flared outwardly at each end. Chains with connecting structure as shown in FIG. 11 might very well be used to transmit driving forces between pulleys which are not disposed in the same plane.

The V-shaped configuration of each of the blocks, as viewed in side elevation, defines large surfaces relative to overall block size, enabling large pushing forces to be transmitted between the blocks substantially unidirectionally and independently of the connecting means. Positioning the connecting means at one distal end of the V-shaped configuration minimizes reduction of the size of the engagement surfaces and places the connecting means, which usually include link or pivot pins, at a position where they are substantially unloaded at all times by the driving force. The link pins need be only as strong as is necessary to hold the links together when unloaded. A continuous push-drive chain according to this invention allows chain load capacity to be increased, while at the same time reducing chain wear.

This invention may be embodied in other specific forms without departing from the spirit or essential attributes thereof. Accordingly, reference should be made to the apended claims, rather than to the foregoing specification, as indicating the scope of the invention.

What is claimed is:
1. A continuous push-drive chain, comprising:
 a plurality of blocks, each of the blocks having a V-shaped configuration in side elevation, the V-shaped configuration being generally transverse to and defining large block engagement surfaces relative to overall block size; and,
 means for connecting adjacent blocks disposed at one distal end of the V-shaped configuration,
 whereby, in operation, large pushing forces between the blocks are transmitted substantially unidirectionally and independently of the connecting means, simultaneously increasing chain load capacity and reducing chain wear.

2. The continuous push-drive chain of claim 1, wherein each of the blocks has a wedge-shaped configuration in front and rear elevation.

3. The continuous push-drive chain of claim 1, wherein the V-shaped configuration is substantially symmetrical, interiorly and exteriorly of a longitudinal chain axis defined by the plurality of connected blocks.

4. The continuous push-drive chain of claim 3, wherein substantially symmetric portions of the V-shaped configuration are swept-back relative to the direction of chain movement during pushing.

5. The continuous push-drive chain of claim 1, wherein the V-shaped configuration enables nested engagement of adjacent blocks.

* * * * *